United States Patent
Qi et al.

(10) Patent No.: US 12,271,708 B2
(45) Date of Patent: Apr. 8, 2025

(54) VIDEO PROCESSING METHOD, VIDEO PROCESSING APPARATUS, AND COMPUTER-READABLE STORAGE MEDIUM

(71) Applicant: BEIJING BYTEDANCE NETWORK TECHNOLOGY CO., LTD., Beijing (CN)

(72) Inventors: Weiwei Qi, Beijing (CN); Yidan Tang, Beijing (CN); Yixiang Zhang, Beijing (CN); Ruie Gao, Beijing (CN); Siqi Tan, Beijing (CN); Ye Lin, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/726,642

(22) Filed: Apr. 22, 2022

(65) Prior Publication Data

US 2023/0169275 A1 Jun. 1, 2023

(30) Foreign Application Priority Data

Nov. 30, 2021 (CN) .......................... 202111447076.5

(51) Int. Cl.
*G06F 40/40* (2020.01)
*G06F 3/0484* (2022.01)
(Continued)

(52) U.S. Cl.
CPC ............ *G06F 40/40* (2020.01); *G06F 3/0484* (2013.01); *G06F 40/166* (2020.01); *G06F 40/51* (2020.01); *G06Q 50/01* (2013.01)

(58) Field of Classification Search
CPC ....... G06Q 50/01; G06F 40/40; G06F 40/166; G06F 3/0484; G06F 40/51; H04M 2242/12
(Continued)

(56) References Cited

U.S. PATENT DOCUMENTS

| 7,992,183 B1 * | 8/2011 | Harrenstien | ........... G06Q 10/00 725/137 |
| 8,645,134 B1 * | 2/2014 | Harrenstien | ............ G10L 15/26 704/235 |

(Continued)

FOREIGN PATENT DOCUMENTS

| CN | 103167360 A | 6/2013 |
| CN | 104378692 A | 2/2015 |

(Continued)

OTHER PUBLICATIONS

Nugroho et al., "Translation Course 4.0 Redefined: Enhancing Work Efficiency and Meaning Accuracy Using AEGISUB 3.2.2 Subtitling Software," 2019 International Seminar on Application for Technology of Information and Communication, 2019. pp. 548-553 (6 pages).

(Continued)

*Primary Examiner* — Patrick F Riegler

(57) ABSTRACT

This disclosure relates to a video processing method, a video processing apparatus, and a computer-readable storage medium. The video processing method includes: receiving an original caption added for a video to be translated by a creator of the video; selecting a translator based on the original caption and a language used by a user on a social network; providing the selected translator with the video to be translated, and providing, in the video, the translator with an interactive interface for translating the original caption in the video; receiving a caption translation of the caption (Continued)

returned by the translator from the interactive page; and displaying, in the video, the caption translation passing assessment.

16 Claims, 12 Drawing Sheets

(51) Int. Cl.
  *G06F 40/166* (2020.01)
  *G06F 40/51* (2020.01)
  *G06Q 50/00* (2012.01)
(58) Field of Classification Search
  USPC .......................................................... 715/719
  See application file for complete search history.

(56) References Cited

U.S. PATENT DOCUMENTS

| | | | |
|---|---|---|---|
| 8,756,050 B1* | 6/2014 | Harkness | G06F 40/51 704/7 |
| 9,418,060 B1* | 8/2016 | Winham | G06F 40/51 |
| 9,696,881 B2* | 7/2017 | Pornprasitsakul | G06F 3/0484 |
| 10,025,776 B1 | 7/2018 | Sjoberg et al. | |
| 2006/0227240 A1* | 10/2006 | Chiu | H04N 21/4884 348/383 |
| 2007/0106516 A1* | 5/2007 | Larson | G11B 27/11 704/E19.048 |
| 2008/0129865 A1* | 6/2008 | Leonard | G11B 27/10 348/E7.001 |
| 2010/0118189 A1* | 5/2010 | Ayoub | G06F 40/58 348/E7.003 |
| 2010/0138209 A1* | 6/2010 | Harrenstien | H04N 21/440236 704/E11.001 |
| 2010/0310234 A1* | 12/2010 | Sigvaldason | H04N 21/2355 386/E5.025 |
| 2012/0054619 A1* | 3/2012 | Spooner | G11B 27/034 715/723 |
| 2012/0275761 A1* | 11/2012 | Li | H04N 5/92 386/239 |
| 2012/0316860 A1* | 12/2012 | Reitan | H04N 9/8233 386/245 |
| 2013/0246040 A1* | 9/2013 | DeLuca | G06Q 50/01 704/2 |
| 2014/0142918 A1 | 5/2014 | Dotterer et al. | |
| 2014/0143218 A1* | 5/2014 | Sanghavi | G06F 16/48 707/695 |
| 2014/0201631 A1* | 7/2014 | Pornprasitsakul | G11B 27/031 715/716 |
| 2014/0303956 A1 | 10/2014 | Wilson | |
| 2015/0046148 A1* | 2/2015 | Oh | G06F 40/58 704/3 |
| 2015/0134322 A1* | 5/2015 | Cuthbert | G06F 40/58 704/3 |
| 2016/0147745 A1 | 5/2016 | Park et al. | |
| 2016/0342587 A1 | 11/2016 | Bastide et al. | |
| 2016/0350284 A1 | 12/2016 | Yan et al. | |
| 2016/0378748 A1 | 12/2016 | Shoshan | |
| 2017/0139904 A1* | 5/2017 | Dakss | G06F 40/51 |
| 2017/0371869 A1* | 12/2017 | Zhang | G06F 40/47 |
| 2018/0034961 A1* | 2/2018 | Engelke | G10L 15/22 |
| 2018/0052833 A1 | 2/2018 | Sarmenta | |
| 2018/0143956 A1* | 5/2018 | Skarbovsky | G06F 40/166 |
| 2018/0144747 A1* | 5/2018 | Skarbovsky | G06F 40/109 |
| 2019/0104259 A1 | 4/2019 | Angquist et al. | |
| 2019/0379943 A1* | 12/2019 | Ayala | H04N 21/4884 |
| 2021/0073341 A1* | 3/2021 | Liu | G06F 16/9535 |
| 2021/0073479 A1* | 3/2021 | Yamada | H04N 21/4316 |
| 2021/0250660 A1 | 8/2021 | Jiang et al. | |
| 2021/0375324 A1* | 12/2021 | Morton | G11B 27/031 |
| 2022/0383228 A1* | 12/2022 | Lee | H04N 21/4856 |

FOREIGN PATENT DOCUMENTS

| | | | |
|---|---|---|---|
| CN | 107688792 A | | 2/2018 |
| CN | 110276349 A | | 9/2019 |
| CN | 111898388 A | | 11/2020 |
| CN | 112104896 A | | 12/2020 |
| CN | 112954434 A | | 6/2021 |
| CN | 114143592 A | | 3/2022 |
| CN | 114143593 A | * | 3/2022 |
| JP | 2009289091 A | | 12/2009 |
| JP | 2010-157961 A | | 7/2010 |
| JP | 2013020559 A | | 1/2013 |
| JP | 2016509408 A | | 3/2016 |
| KR | 10-2016-0081032 A | | 7/2016 |
| KR | 10-2018-0006728 A | | 1/2018 |
| KR | 20180066398 A | | 6/2018 |
| KR | 10-2019-0141331 A | | 12/2019 |
| WO | 2021057908 A1 | | 4/2021 |

OTHER PUBLICATIONS

Zhao, Jian-hui, "Translation Strategies of Short Video Subtitle Metaphor from the Perspective of Contextual Adaptation," Journal of Hubei University of Education, vol. 38, No. 11, pp. 100-104, Nov. 2021, with English Abstract (6 pages).
Non-Final Office Action mailed on May 23, 2024, for U.S. Appl. No. 17/726,728, pp. 40.
Office action received from Japanese patent application No. 2024-532477 mailed on Oct. 22, 2024, 10 pages (5 pages English Translation and 5 pages Original Copy).
Request for the Submission of an Opinion for Korean Application No. 10-2024-7020364, mailed Nov. 26, 2024, 15 pages.
Examination Report No. 1 for Australian Application No. 2022399687, mailed Jan. 6, 2025, 2 Pages.
Extended European Search Report for European Application No. 22900336.3, mailed Jan. 31, 2025, 6 Pages.
Extended European Search Report for European Application No. 22900338.9, mailed Jan. 23, 2025, 10 Pages.
Final Office Action for U.S. Appl. No. 17/726,728, mailed Nov. 21, 2024, 19 pages.

* cited by examiner

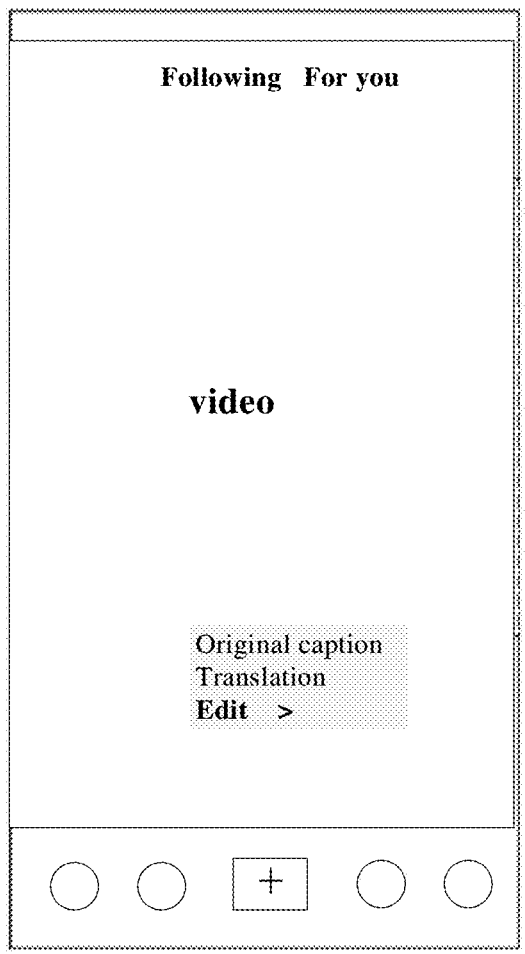
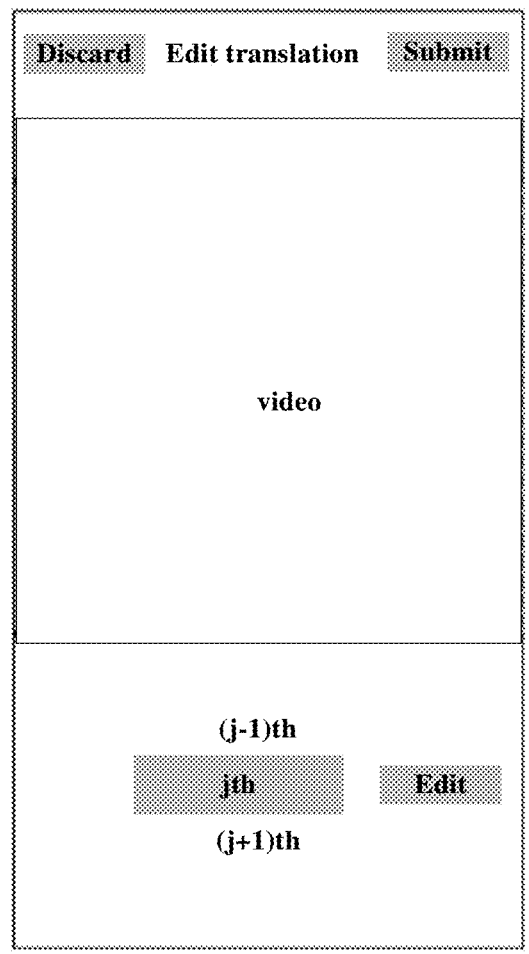
Fig. 3A
Fig. 3B

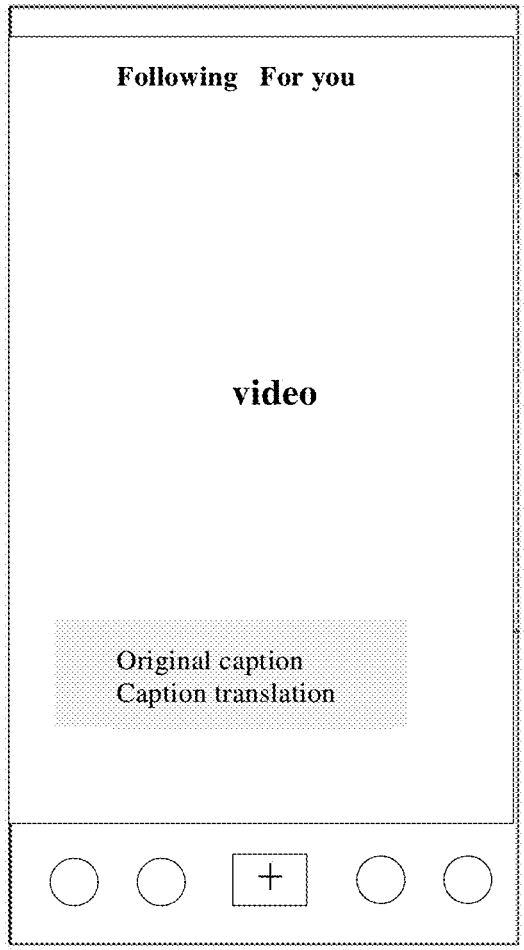
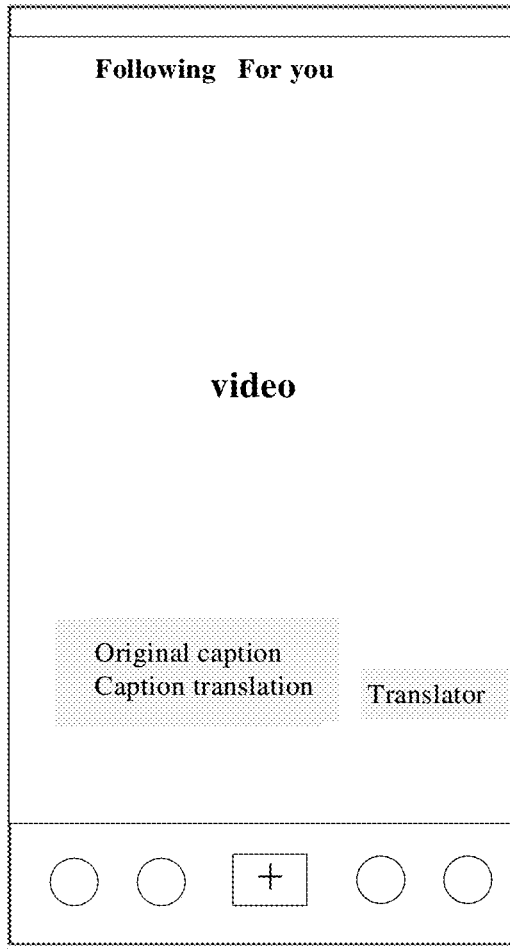
Fig. 6A  Fig. 6B
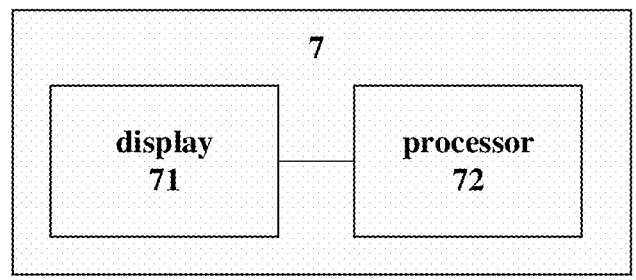
Fig. 7

VIDEO PROCESSING METHOD, VIDEO PROCESSING APPARATUS, AND COMPUTER-READABLE STORAGE MEDIUM

CROSS-REFERENCE TO RELATED APPLICATIONS

This application claims priority to Chinese Patent Application No. 202111447076.5, entitled "VIDEO PROCESSING METHOD, VIDEO PROCESSING APPARATUS, AND COMPUTER-READABLE STORAGE MEDIUM", and filed on Nov. 30, 2021. The entire disclosure of the prior application is hereby incorporated by reference in its entirety.

TECHNICAL FIELD

This disclosure relates to the field of computer technologies, and in particular, to a video processing method, a video processing apparatus, and a computer-readable storage medium.

BACKGROUND

A social network can, according to an input of a user, provide various services, such as photo or video sharing, messaging, etc., to facilitate social interaction between users.

With the interaction with the social network, the user can upload digital media to a system for browsing by others. The digital media can include image, video, audio, text, and the like. For example, the user can post a self-created video onto the social network. The other users on the social network can interact with the video creator by means of browsing, likes, comments, and the like.

With the user's increasing dependence on the social network, the user has higher and higher requirements for experience of the social network, especially for quality of caption translation in the video.

SUMMARY

According to some embodiments of the present disclosure, there is provided a video processing method, comprising:
  receiving an original caption added for a video to be translated by a creator of the video;
  selecting a translator based on the original caption and a language used by a user on a social network;
  providing the selected translator with the video to be translated, and providing, in the video, the translator with an interactive interface for translating the original caption in the video;
  receiving a caption translation of the caption returned by the translator from the interactive interface; and
  displaying, in the video, the caption translation passing assessment.

According to other embodiments of the present disclosure, there is provided a video processing apparatus, comprising:
  a processor configured to
    receive an original caption added for a video to be translated by a creator of the video;
    select a translator based on the original caption and a language used by a user on a social network;
    provide the selected translator with the video to be translated, and provide, in the video, the translator with an interactive interface for translating the original caption in the video; and
    receive a caption translation of the caption returned by the translator from the interactive interface; and
  a display configured to display, in the video, the caption translation passing assessment.

According to still other embodiments of the present disclosure, there is provided a video processing apparatus, comprising:
  a memory; and
  a processor coupled to the memory, the processor being configured to perform, based on instructions stored in the memory, one or more steps of the video processing method of any of the embodiments according to the present disclosure.

According to further embodiments of the present disclosure, there is provided a computer-readable storage medium having thereon stored a computer program which, when executed by a processor, performs one or more steps of the video processing method of any of the embodiments according to the present disclosure.

The "SUMMARY" is provided to introduce concepts in a simplified form, which will be described in detail below in the following "DETAILED DESCRIPTION OF THE DRAWINGS". The "SUMMARY" is not intended to identify key features or essential features of the claimed technical solutions, nor is it intended to limit the scope of the claimed technical solutions.

Other features, aspects, and advantages of the present disclosure will become apparent from the following detailed description of exemplary embodiments thereof, which is made with reference to the accompanying drawings.

BRIEF DESCRIPTION OF THE DRAWINGS

Preferred embodiments of the present disclosure will be described below with reference to the accompanying drawings. The accompanying drawings are used for providing a further understanding of the present disclosure. The accompanying drawings, together with the description, are incorporated in and form a part of this specification, and serve to explain the present disclosure. It should be understood that the drawings in the following description relate to only some embodiments of the present disclosure and do not constitute limitations on the present disclosure. In the drawings:

FIGS. 3A to 3C illustrate schematic diagrams of interactive interfaces for translating an original caption in a video according to some embodiments of the present disclosure;

FIG. 6A illustrates a schematic diagram of a video playing page according to other embodiments of the present disclosure;

FIG. 6B illustrates a schematic diagram of an interactive interface for translator's interaction with a viewer according to some embodiments of the present disclosure;

FIG. 7 illustrates a block diagram of a video processing apparatus according to some embodiments of the present disclosure;

Figure 1:
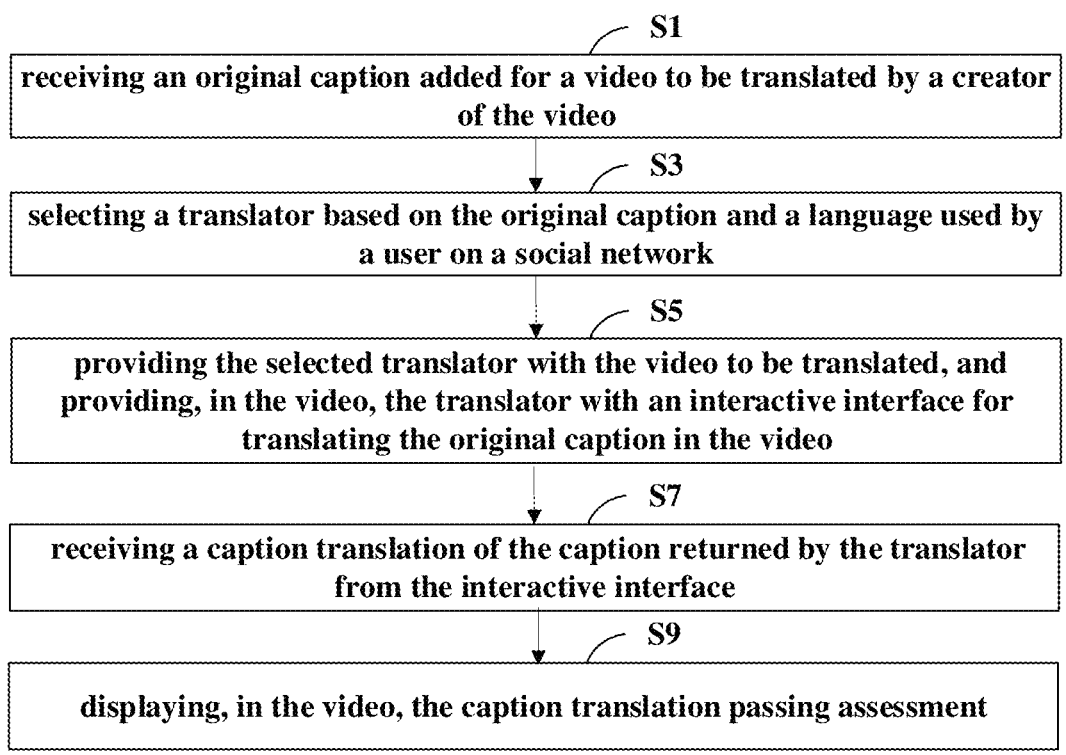
FIG. 1 illustrates a flow diagram of a video processing method according to some embodiments of the present disclosure.

It should be understood that sizes of various components shown in the drawings are not necessarily drawn to an actual scale for ease of description. Identical or similar reference numbers are used throughout the drawings to refer to identical or similar components. Therefore, once a certain item is defined in one drawing, it may not be further discussed in subsequent drawings.

DETAILED DESCRIPTION

Technical solutions in embodiments of the present disclosure will be described clearly and completely with reference to the drawings in the embodiments of the present disclosure, but it is obvious that the embodiments described are only some of the embodiments of the present disclosure, not all of the embodiments. The following description of the embodiments is merely illustrative in nature and is in no way intended to limit this disclosure, its application, or uses. It should be understood that the present disclosure can be implemented in various forms and should not be construed as limited to the embodiments set forth herein.

It should be understood that various steps recited in method embodiments of the present disclosure can be performed in a different order, and/or performed in parallel. Moreover, the method embodiments can comprise additional steps and/or omit performing the illustrated steps. The scope of the present disclosure is not limited in this respect. Unless specifically stated otherwise, relative arrangements of components and steps, numerical expressions, and numerical values set forth in these embodiments should be construed as merely illustrative, and do not limit the scope of the present disclosure.

A term "comprise" and variations thereof used in this disclosure are intended to be an open-minded term that comprise at least the following elements/features, but do not exclude other elements/features, i.e., "comprising but not limited to". Furthermore, a term "include" and variations thereof used in this disclosure are intended to be an open-minded term that comprises at least the following elements/features, but do not exclude other elements/features, i.e., "including but not limited to". Therefore, "comprise" is synonymous with "include". A term "based on" means "based at least in part on".

Throughout this specification, termed "one embodiment", "some embodiments", or "an embodiment" means that a specific feature, structure, or characteristic described in conjunction with the embodiment is comprised in at least one embodiment of the present invention. For example, the term "one embodiment" means "at least one embodiment"; the term "another embodiment" means "at least one other embodiment"; the term "some embodiments" means "at least some embodiments". Moreover, the phrases "in one embodiment," "in some embodiments," or "in an embodiment" appearing in various places throughout this specification do not necessarily all refer to a same embodiment, but can also refer to the same embodiment.

It should be noted that notions of "first", "second", and the like mentioned in the present disclosure are only used for distinguishing different devices, modules or units, and are not used for limiting the order or interdependence of functions performed by the devices, modules or units. Unless otherwise specified, the notions "first", "second", and the like are not intended to imply that objects so described must be in a given order in time, space, rank, or any other way.

It should be noted that modifiers of "a" or "an" mentioned in this disclosure are intended to be illustrative rather than restrictive, and those skilled in the art should appreciate that they should be understood as "one or more" unless otherwise clearly indicated in the context.

Names of messages or information exchanged between devices in the embodiments of the present disclosure are for illustrative purposes only, and are not intended to limit the scope of these messages or information.

The embodiments of the present disclosure will be described in detail below with reference to the accompanying drawings, but the present disclosure is not limited to these specific embodiments. These specific embodiments can be combined with each other below, and identical or similar concepts or processes may not be repeated in some embodiments. Furthermore, the specific feature, structure, or characteristic can be combined in any suitable manner that would be apparent to one of ordinary skill in the art from this disclosure in one or more embodiments.

It should be understood that how an image or video to be applied/processed is obtained is also not limited in the present disclosure. In one embodiment of the present disclosure, the image or video can be acquired from a storage device, such as an internal memory or an external storage device, and in another embodiment of the present disclosure, the image or video can be taken by a camera assembly. It should be noted that in the context of this specification, a type of the image or video is not specifically limited. Furthermore, the image or video can be a source image or video obtained by a camera device, or an image or video that is obtained by particularly processing the source image or video, for example, preliminary filtering, antialiasing, color adjustment, contrast adjustment, normalization, and the like. It should be noted that the preprocessing operation can also comprise other types of preprocessing operations known in the art, which will not be repeated herein.

With the user's increasing dependence on a social network, the user has higher and higher requirements for experience of the social network, especially for quality of caption translation in a video. In the related art, only a video poster can edit and post caption information of the video. To further improve the quality of the caption translation in the video, the caption translation in the video is provided using crowdsourcing translation.

FIG. 1 illustrates a flow diagram of a video processing method according to some embodiments of the present disclosure.

As shown in FIG. 1, the video processing method comprises: step S1, receiving an original caption added for a video to be translated by a creator of the video; step S3, selecting a translator based on the original caption and a language used by a user on a social network; step S5, providing the selected translator with the video to be translated, and providing, in the video, the translator with an interactive interface for translating the original caption in the video; step S7, receiving a caption translation of the caption returned by the translator from the interactive page; and step S9, displaying, in the video, the caption translation of the caption passing assessment.

In the step S1, the original caption added for the video to be translated by the creator of the video can be received by providing the creator of the video with an interactive interface for caption management.

FIG. 2A to 2G illustrate schematic diagrams of interactive interfaces for caption management according to some embodiments of the present disclosure.

Figures 2A, 2B:
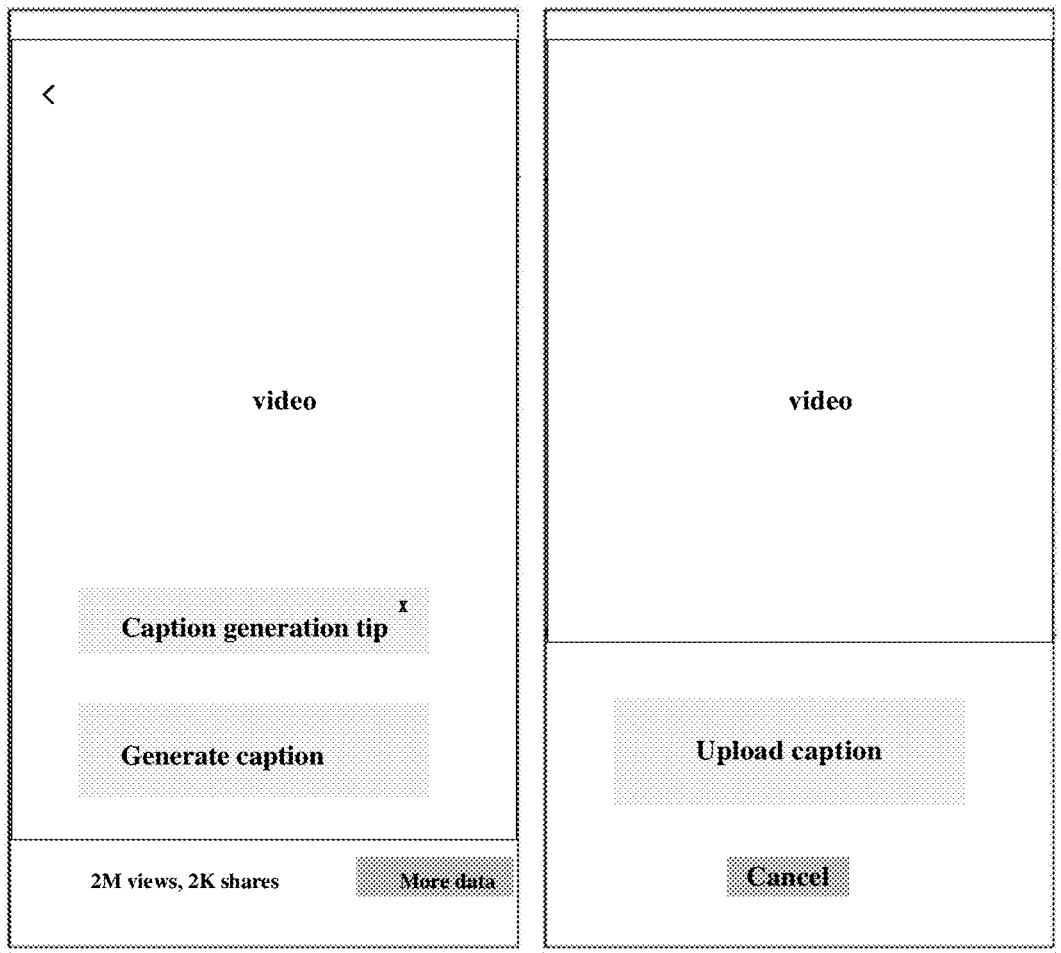
FIGS. 2A to 2G illustrate schematic diagrams of interactive interfaces for caption management according to some embodiments of the present disclosure.

As shown in FIG. 2A, when the creator of the video plays the video to be translated, an option of "Generate caption" is displayed in the video, for example in a form of a banner. FIG. 2A can also illustrate video views and shares of the video to be translated. FIG. 2A can also illustrate a caption generation tip above the option of "Generate caption". The caption generation tip will disappear after the creator of the video clicks on a Close button. The tip will also automatically disappear after the creator of the video has successfully added the caption.

If the user clicks on the "Generate caption" button, he/she will enter an "Add caption" page. On the "Add caption" page, the creator of the video can upload the original caption, as shown in FIG. 2B. FIG. 2B can also illustrate a progress of uploading the caption, for example, 20% has been uploaded. FIG. 2B also provides an option of Discard, and the Discard button can be clicked when the creator of the video wishes to discard the operation of uploading the caption.

For a creator unfamiliar with the caption management, for example, a creator who uses the caption management for the first time, before a caption is added, operation guidance provided by a platform can be opened for learning how to add caption. For example, the operation guidance will notify the creator of the video that the original caption can be generated first, and then the original caption can be automatically translated by a translator (for example, a viewer from the world), and a community translator can help optimize the automatically translated caption translation.

After the caption has been added by the creator of the video, a tip can be presented to notify that the caption will be automatically translated.

Figure 2C:
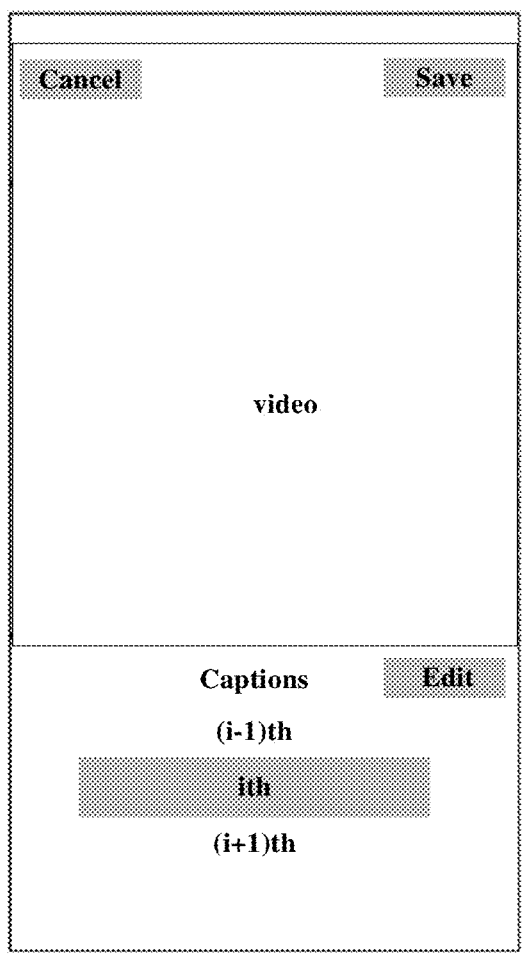

After the creator of the video finishes uploading the original caption, a preview page can be entered, as shown in FIG. 2C. As shown in FIG. 2C, a plurality of captions are displayed on the preview page, and the captions are highlighted one by one (for example, sentence by sentence). In response to a playing request for the video, the video can be played in a manner that speech synchronizes with the caption. In the preview page of FIG. 2C, options of Edit, Discard, Save, etc. are also provided. The creator of the video can click on corresponding option buttons to perform operations such as edit, discard or save, according to a specific situation.

Figure 2D:
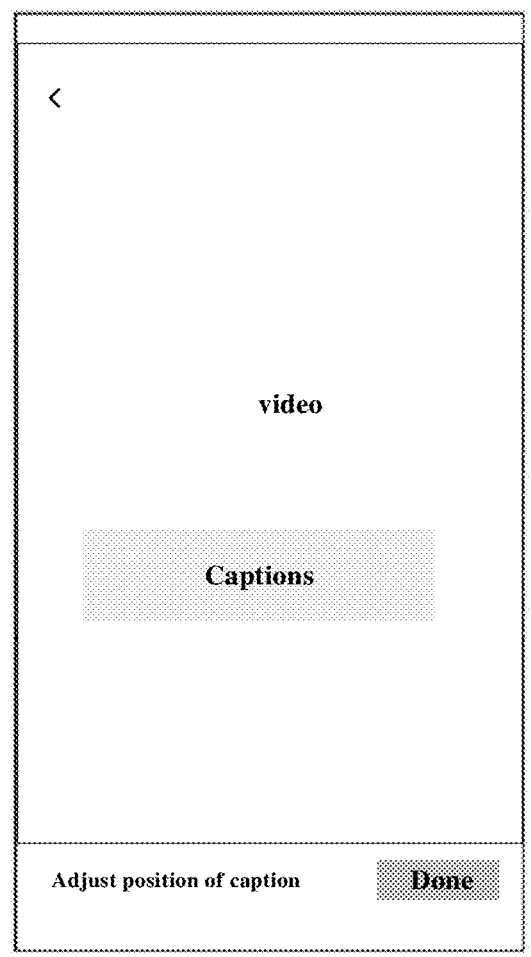

The caption added by the creator will be displayed on a corresponding video playing page, as shown in FIG. 2D. In FIG. 2D, there can also comprise a tip of adjusting a position of the caption. The creator of the video can adjust the position of the caption on the video playing page by means of, for example, dragging.

Figure 2E:
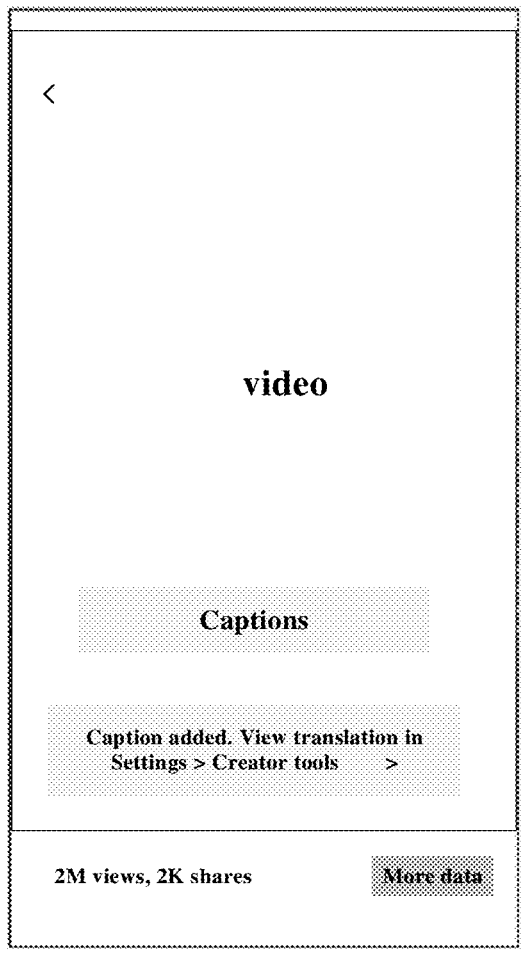

After the position of the caption has been adjusted, i.e., the caption has been added, on the page, there is displayed a tip of "Caption added" and is provided an entry to entering a caption management page by the creator of the video from an option of "Creator tools" in "Settings", as shown in FIG. 2E.

Figure 2F:
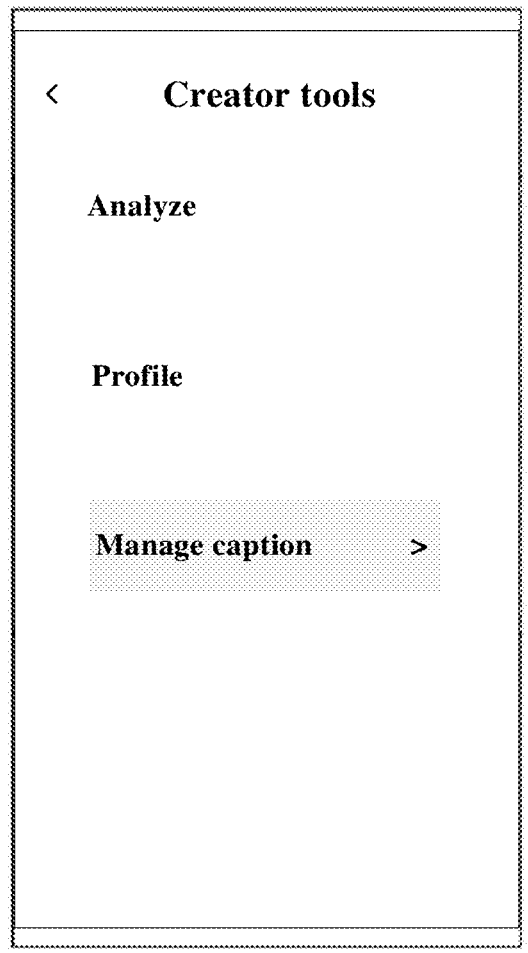
Figure 2G:
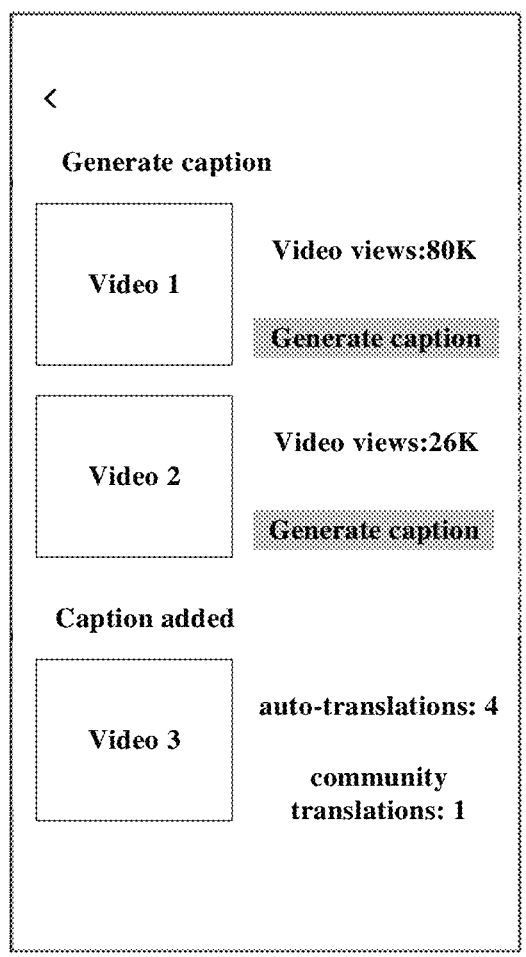

FIG. 2F illustrates a "Creator tools" page. If a user clicks on "Manage caption", he/she will enter the caption management page, as shown in FIG. 2G. On the caption management page of FIG. 2G is displayed a caption state of the video. The caption state of the video comprises caption to be generated (i.e., generate caption) and caption added.

For the video with the to be generated caption, the video is ranked according to the video view. In some embodiments, the video view is displayed on a video cover on the caption management page, for example, in a language different from a language of the creator.

For the video with caption added, a type of the caption translation can also be displayed on the caption management page, for example, whether it belongs to an auto-translation or a community translation. In some embodiments, for the video with the caption added, the number of auto-translations and the number of community translations can also be displayed separately on the caption management page.

In some embodiments, the video is ranked on the caption management page according to an update time. For example, update can be performed at the following time: the caption translation having been added; the caption having being translated by the translator; or the caption translation of the translator being removed by the creator.

In the above embodiments, there is provided a path of entering the "Add caption" page from the notification bar of "Generate caption" in the played video. The creator of the video can also directly enter from the "Creator tools" page shown in FIG. 2F. If a user clicks on the "Manage caption" therein, he/she will enter the caption management page. After the caption management page is entered, the caption can be added by clicking on the "Generate caption" button on the video to be translated; and the caption can also be added by clicking on the cover of the video to be translated to view the video and clicking on the "Generate caption" button on the video.

For the creator of the video, even if the added caption has been already submitted, the caption can be edited again through the caption management page.

In the step S3, the language used by the user can comprise at least one of: a system language used by the user, a video language browsed by the user, or a language inputted by the user. For example, if the original caption of the video is English and it is desired to be translated into Chinese or Japanese, a user for whom the system language used by the user, the video language browsed by the user, or the language inputted by the user, comprises English, as well as Chinese or Japanese, can be selected as a translator. The selection of a translator, who uses a language matching with the languages of the original caption and translation by the user, can more effectively improve the quality of the translation and the efficiency of translation assessment.

The translator can be a registered or enrolled community translator, or can be an unregistered translator. For the unregistered translator, guidance on registration as a community translator can also be provided for the translator. Selecting the registered translator to provide the translation can further effectively improve the quality of the translation and the efficiency of translation assessment.

In some embodiments, the translator can also be selected according to the type of the video to be translated and a type of videos in which the user is interested. For example, expected interest values of the user for different types of videos are determined according to history behavior data of the user; the type of the videos in which the user is interested is determined according to the expected interest values of the user for the different types of videos; and a user for whom the type of the interested videos match with the type of the video to be translated is selected as the translator. Providing the translator with the video of his/her favorite type can improve the translation enthusiasm of the translator, and is also beneficial to improving the quality of the translation and is easy to reduce the cost of translation assessment.

Figure 3C:
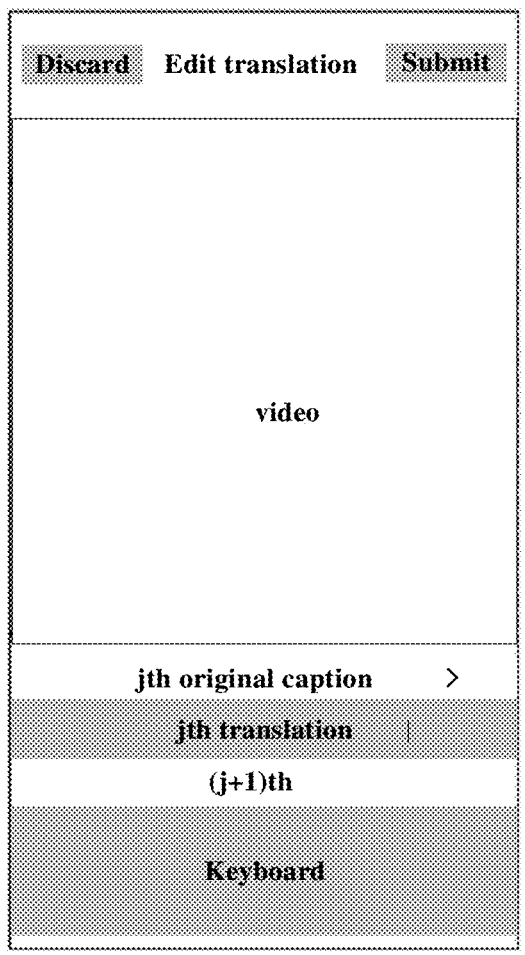
Figure 3D:
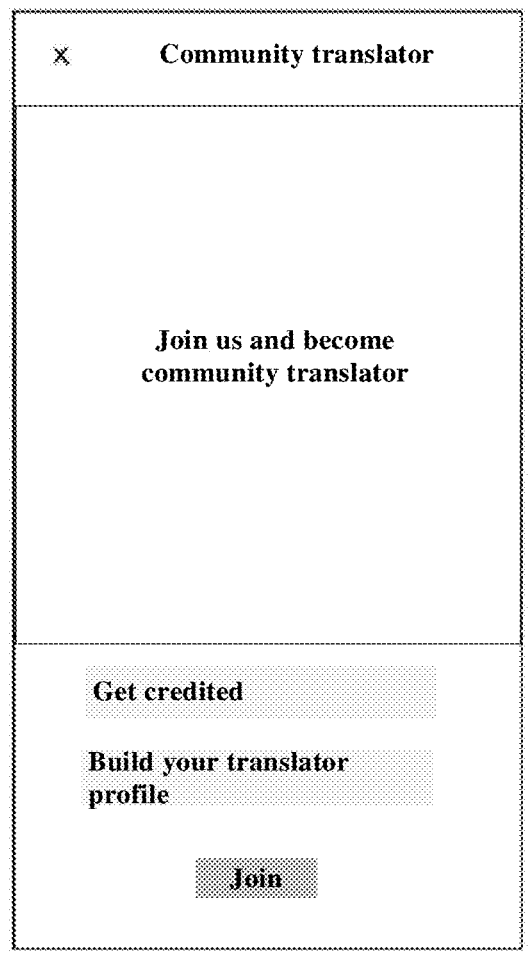
FIG. 3D illustrates a schematic diagram of guiding registration as a community translator according to some embodiments of the present disclosure.

The step S5 will be described below in conjunction with FIGS. 3A to 3D. FIGS. 3A to 3C illustrate schematic diagrams of interactive interfaces for translating an original caption in a video according to some embodiments of the present disclosure. FIG. 3D illustrates a schematic diagram of guiding registration as a community translator according to some embodiments of the present disclosure.

In the step S5, only the selected translator is provided with the video to be translated, and the translator is, in the video, provided with the interactive interface for translating the original caption in the video, as shown in FIG. 3A. In FIG. 3A, the translator is provided, in-feed in the video, with a translation of the original caption in the video to be translated. FIG. 3A can also illustrate the original caption. The interactive interface for translating the original caption in the video is not provided for other users than the selected translator.

In response to an edit request for the translation from the translator, a proofreading page is entered, as shown in FIG. 3B. In FIG. 3B, original captions are displayed one by one (for example, sentence by sentence) on the proofreading page and a translation is displayed below each original caption, and an edit position is directed to a translation of a caption selected by the translator. The translation can be a machine translation or a caption translation of the caption provided by another translator.

The edit interface can comprise a pop-up keyboard as shown in FIG. 3C. The translator can clear the translation and input his/her own caption translation. After finishing the caption translation, the translator can submit to the platform to wait for assessment. After the assessment are passed, he/she will receive a notification from the platform. That is, the video processing method further comprises: sending a notification to the translator after the caption translation of the translator passes the assessment. Of course, the translator can also enter a corresponding task management interface to view a state of the caption translation, which is, for example, under review, passing review or assessment, not passing assessment, or the like.

In some embodiments, the providing, in the video, the translator with an interactive interface for translating the original caption in the video further comprises providing the translator with the guidance on registration as the community translator, as shown in FIG. 3D.

Figure 4A:
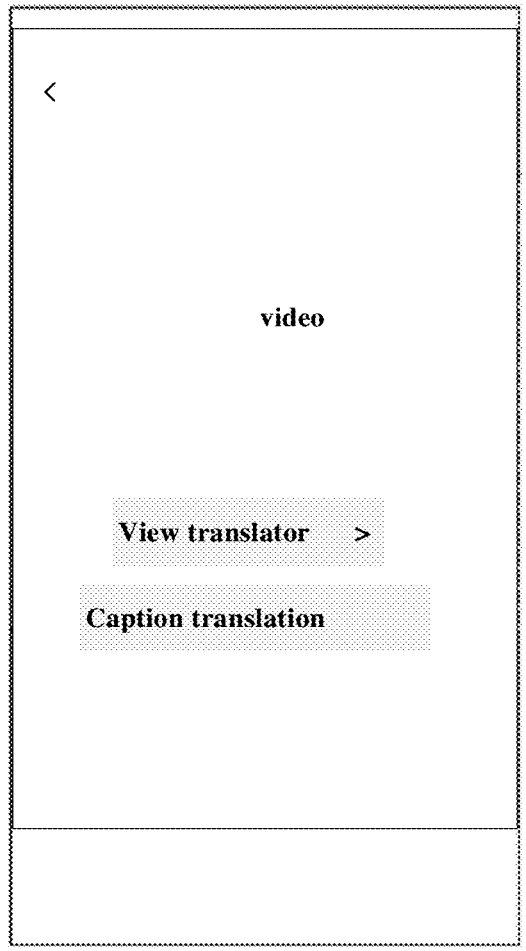
FIG. 4A illustrates a schematic diagram of a caption translation of the caption viewing page according to some embodiments of the present disclosure.
Figure 4B:
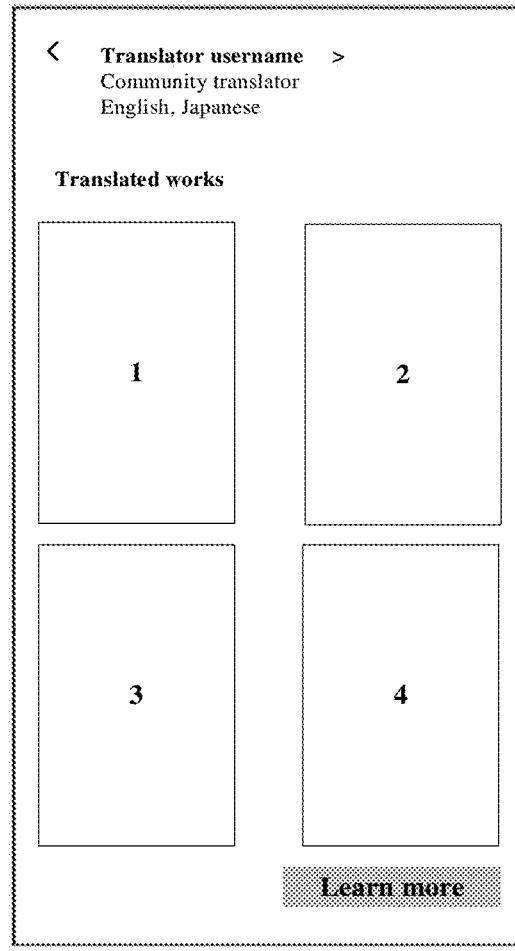
FIG. 4B illustrates a schematic diagram of a translator information page according to some embodiments of the present disclosure.
Figure 5A:
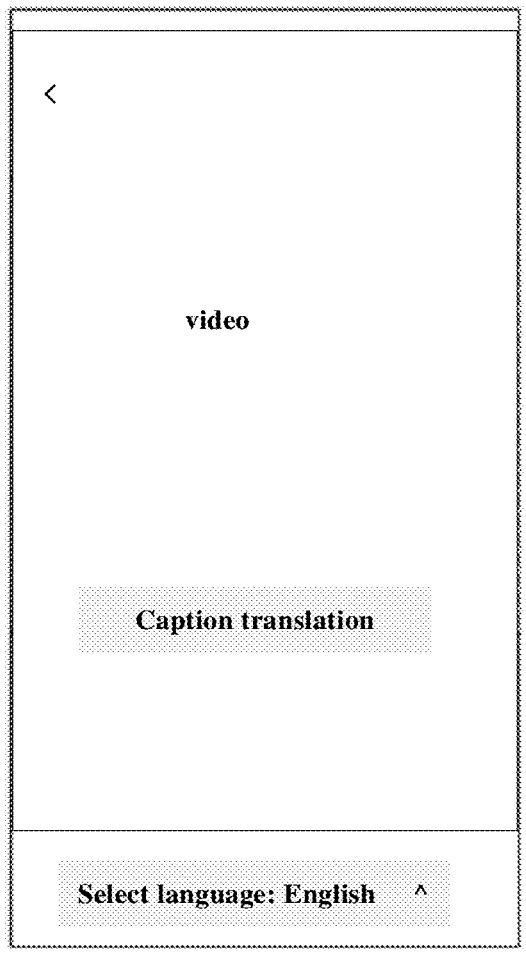
FIG. 5A illustrates a schematic diagram of a video playing page according to some embodiments of the present disclosure.
Figure 5B:
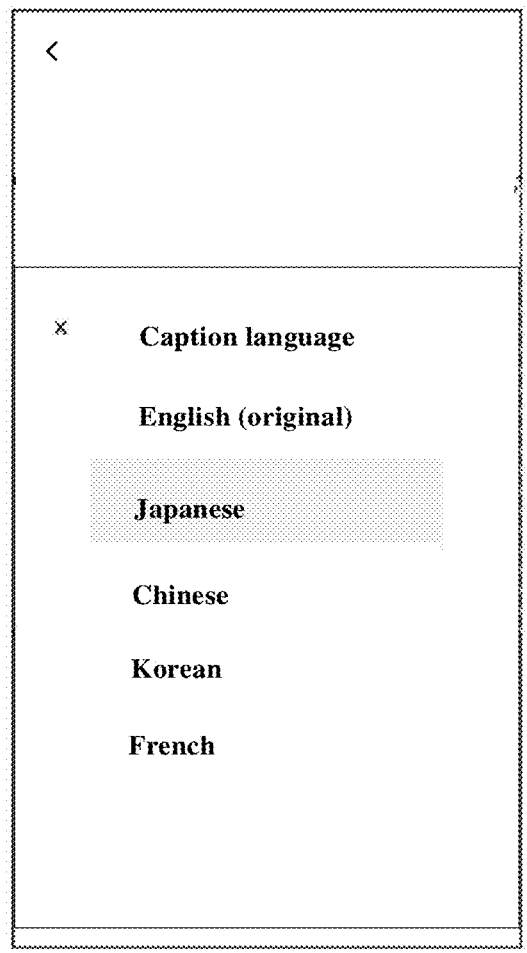
FIG. 5B illustrates a schematic diagram of a caption language management page according to some embodiments of the present disclosure.
Figure 5C:
FIG. 5C illustrates a schematic diagram of a caption translation of the caption viewing page according to other embodiments of the present disclosure.

The step S7 will be described below in conjunction with FIGS. 4A to 5C. FIG. 4A illustrates a schematic diagram of a caption translation of the caption viewing page according to some embodiments of the present disclosure. FIG. 4B illustrates a schematic diagram of a translator information page according to some embodiments of the present disclosure. FIG. 5A illustrates a schematic diagram of a video playing page according to some embodiments of the present disclosure. FIG. 5B illustrates a schematic diagram of a caption language management page according to some embodiments of the present disclosure. FIG. 5C illustrates a schematic diagram of a caption translation of the caption viewing page according to other embodiments of the present disclosure.

In the step S7, the caption translation returned by the translator from the interactive page is received and reviewed. In some embodiments, the creator of the video can also be notified that there already has a caption translation of the caption passing the assessment. The creator of the video can view the caption translation according to a path provided by the notification, such as the caption translation viewing page shown in FIG. 4A. The creator of the video can also enter the translator information page to view information about the translator by clicking on a "View translator" button shown in FIG. 4A, as shown in FIG. 4B. FIG. 4B illustrates an identity of the translator, for example, whether he/she belongs to a community translator, a language he/she is good at, and can also show thumbnails (for example, video covers) of other translated works of the translator.

The creator of the video can also go to the video playing page by clicking on the video, as shown in FIG. 5A. In FIG. 5A, on the video playing page, there is displayed the original caption by default, but is provided an option of Language. After the option of Language is clicked, the caption language management page is entered, as shown in FIG. 5B. In FIG. 5B, the language of the original caption is presented, as well as languages of various versions of caption translations. The creator of the video can select a caption translation of the caption in a corresponding language and view a corresponding caption translation, as shown in FIG. 5C. Similar to FIG. 4A, FIG. 5C illustrates the caption translation, and displays a "View translator" button. As described above, the creator of the video can also click on the "View translator" button shown in FIG. 5C, and enter the translator information page to view information about the translator, as shown in FIG. 4B. The creator of the video can also remove the translator's caption translation through a "Remove translator's editing" button shown in FIG. 5C. The caption translation adopted by the creator of the video will be posted.

The step S9 will be described below in conjunction with FIGS. 6A to 6B. FIG. 6A illustrates a schematic diagram of a video playing page according to other embodiments of the present disclosure. FIG. 6B illustrates a schematic diagram of an interactive interface for translator's interaction with a viewer according to some embodiments of the present disclosure.

In the step S9, the caption translation passing the assessment is displayed in the video. As shown in FIG. 6A, the original caption and the posted caption translation of the video will synchronize with the speech of the video.

In some embodiments, the video processing method further comprises: providing, in the video, the interactive interface for the translator's interaction with the viewer as shown in FIG. 6B. In FIG. 6B, in the video, there is displayed the caption translation passing the assessment, and is displayed a signature of the translator corresponding to the caption translation, for example, a username of the translator. The viewer can perform interactions such as likes, etc., for the translator shown in FIG. 6B.

In the above embodiments, a complete solution is provided for the crowdsourcing translation of the video, and is capable of more effectively improving the quality of the translation and the efficiency of the translation assessment.

FIG. 7 illustrates a block diagram of a video processing apparatus according to some embodiments of the present disclosure. As shown in FIG. 7, a video processing apparatus 7 comprises a processor 71 and a display 72.

The processor 71 is configured to: receive an original caption added for a video to be translated by a creator of the video; select a translator based on the original caption and a language used by a user on a social network; provide the selected translator with the video to be translated, and provide, in the video, the translator with an interactive interface for translating the original caption in the video; and receive a caption translation of the caption returned by the translator from the interactive page. For example, the processor 71 is configured to perform the steps S1 to S7.

The display 72 is configured to display, in the video, a caption translation of the caption passing assessment, for example, performing the step S9.

Furthermore, although not shown, the apparatus can also comprise a memory, which can have thereon stored various information generated in operations by the video processing apparatus and the units comprised in the video processing apparatus, programs and data for the operations, and the like. The memory can be a volatile memory and/or non-volatile memory. For example, the memory can include, but is not limited to, a random access memory (RAM), dynamic random access memory (DRAM), static random access memory (SRAM), read-only memory (ROM), flash memory. Of course, the memory can also be located outside the video processing apparatus.

Figure 8:
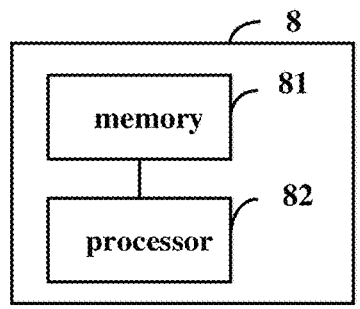
FIG. 8 illustrates a block diagram of a video processing apparatus according to other embodiments of the present disclosure.

FIG. 8 illustrates a block diagram of a video processing apparatus according to other embodiments of the present disclosure.

In some embodiments, a video processing apparatus 8 can be various types of devices, which can include, for example, but are not limited to, mobile terminals such as a mobile phone, a notebook computer, a digital broadcast receiver, a PDA (Personal Digital Assistant), a PAD (Tablet Personal Computer), a PMP (Portable Multimedia Player), a vehicle-mounted terminal (for example, a vehicle-mounted navigation terminal), and the like, and fixed terminals such as a digital TV, a desktop computer, and the like.

As shown in FIG. 8, the video processing apparatus 8 comprises: a memory 81 and a processor 82 coupled to the memory 81. It should be noted that the components of the video processing apparatus 8 shown in FIG. 8 are only exemplary and not restrictive, and the video processing apparatus 8 can also have other components according to the needs of practical application. The processor 82 can control the other components in the video processing apparatus 8 to perform a desired function.

In some embodiments, the memory 81 is configured to store one or more computer-readable instructions. The processor 82 is configured to execute the computer-readable instructions which, when executed by the processor 82, implement the method according to any of the above embodiments. For specific implementations of each step of the method and related explanations, reference can be made to the foregoing embodiments, which are not repeated herein.

For example, the processor 82 and the memory 81 can be indirect or indirect communication with each other. For example, the processor 82 and the memory 81 can communicate through a network. The network can comprise a wireless network, a wired network, and/or any combination of wireless and wired networks. The processor 82 and the memory 81 can also communicate with each other through a system bus, which is not limited in the present disclosure.

For example, the processor 82 can be embodied as various suitable processors, processing devices, and the like, such as a central processing unit (CPU), graphics processing unit (GPU), network processor (NP), and the like; but can also be a digital signal processor (DSP), application specific integrated circuit (ASIC), field programmable gate array (FPGA) or other programmable logic device, discrete gate or transistor logic, discrete hardware component. The central processing unit (CPU) can be an X86 or ARM architecture, etc. For example, the memory 81 can comprise any combination of various forms of computer-readable storage media, such as a volatile memory and/or non-volatile memory. The memory 81 can comprise, for example, a system memory, which has thereon stored, for example, an operating system, application program, boot loader, database, other program, and the like. Various application programs and various data and the like can also be stored in the storage medium.

Figure 9:
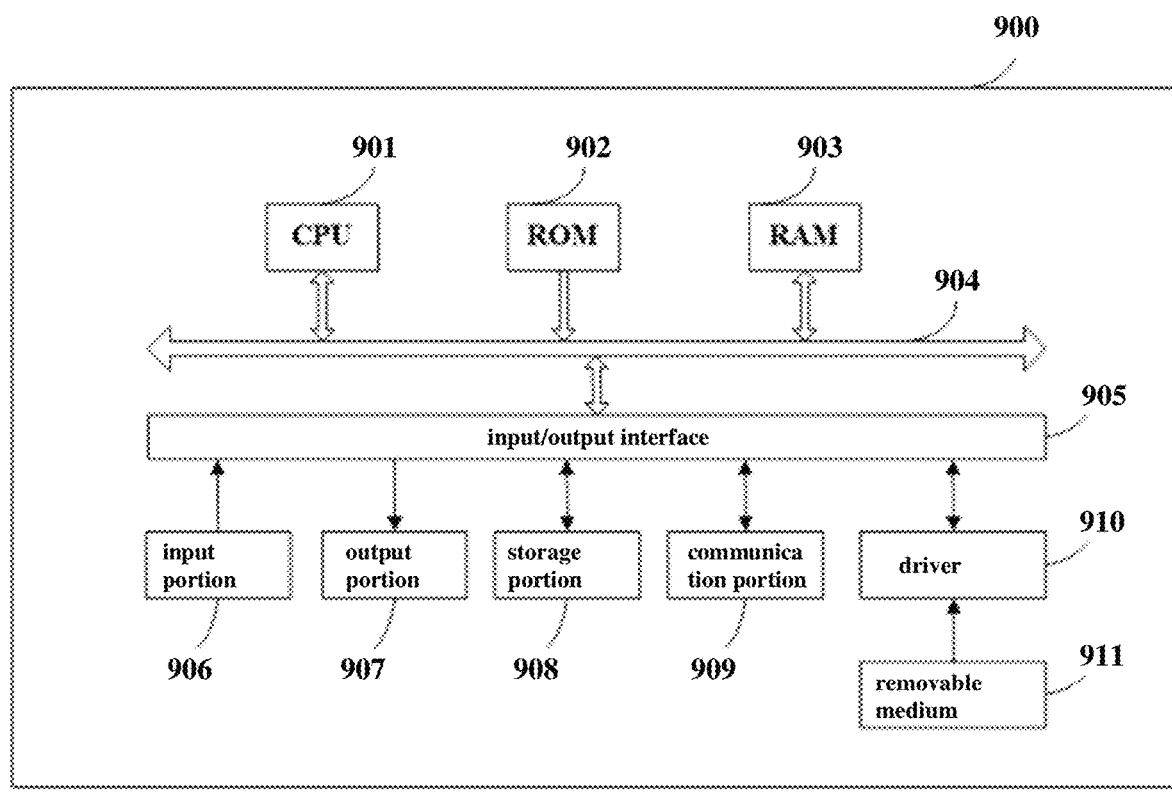
FIG. 9 illustrates a block diagram of an electronic device according to some embodiments of the present disclosure.

In addition, according to some embodiments of the present disclosure, in the case where various operations/processing according to the present disclosure is implemented by software and/or firmware, a program constituting the software can be installed from a storage medium or a network to a computer system having a dedicated hardware structure, for example, a computer system of an electronic device 900 shown in FIG. 9, which when has thereon installed various programs, is capable of performing various functions comprising functions such as those described above and the like.

In FIG. 9, a central processing unit (CPU) 901 performs various processing according to a program stored in a read-only memory (ROM) 902 or a program loaded from a storage portion 908 to a random access memory (RAM) 903. In the RAM 903, data needed when the CPU 901 executes the various processing and the like is also stored as needed. The central processing unit is merely exemplary and can be other types of processors such as the various processors described above. The ROM 902, RAM 903, and storage portion 908 can be various forms of computer-readable storage media, as described below. It should be noted that although the ROM 902, RAM 903, and storage portion 908 are shown separately in FIG. 9, one or more of them can be combined or located in a same memory or storage module, or different memories or storage modules.

The CPU 901, ROM 902, and RAM 903 are connected to each other via a bus 904. An input/output interface 905 is also connected to the bus 904.

The following components are connected to the input/output interface 905: an input portion 906 such as a touch screen, a touch pad, a keyboard, a mouse, an image sensor, a microphone, an accelerometer, a gyroscope, and the like; an output portion 907 comprising a display such as a cathode ray tube (CRT), a liquid crystal display (LCD), a speaker, a vibrator, and the like; the storage portion 908 comprising a hard disk, a magnetic tape, and the like; and a communication portion 909 comprising a network interface card such as a LAN card, a modem, and the like. The communication portion 909 allows communication processing to be performed via a network such as the Internet. It is readily appreciated that while the various devices or modules in the electronic device 900 shown in FIG. 9 communicate through the bus 904, they can also communicate through a network or another manner, wherein the network can comprise a wireless network, a wired network, and/or any combination of wireless and wired networks.

A driver 910 is also connected to the input/output interface 905 as needed. A removable medium 911 such as a magnetic disk, an optical disk, a magneto-optical disk, a semiconductor memory, or the like is mounted on the drive 910 as needed, so that a computer program read out therefrom is installed in the storage portion 908 as needed.

In the case where the series of processing described above is implemented by software, a program constituting the software can be installed from a network such as the Internet or a storage medium such as the removable medium 911.

According to an embodiment of the present disclosure, the process described above with reference to the flow diagram can be implemented as a computer software program. For example, in the embodiment of the present disclosure, a computer program product is comprised, which comprises a computer program carried on a computer-readable medium, the computer program comprising program code for performing the method illustrated by the flow diagram. In such an embodiment, the computer program can be downloaded and installed from a network through the communication device 909, or installed from the storage portion 908, or installed from the ROM 902. The computer program, when executed by the CPU 901, performs the above functions defined in the method of the embodiment of the present disclosure.

It should be noted that in the context of this disclosure, a computer-readable medium can be any tangible medium that can have thereon contained or stored a program for use by or in conjunction with an instruction execution system, apparatus, or device. The computer-readable medium can be a computer-readable signal medium or a computer-readable storage medium or any combination of the two. The computer-readable storage medium can be, for example, but is not limited to: an electronic, magnetic, optical, electromagnetic, infrared, or semiconductor system, apparatus, or device, or any combination of the above. More specific examples of the computer-readable storage medium can comprise, but are not limited to: an electric connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the computer-readable storage medium can be any tangible medium that can have thereon contained or stored a program for use by or in conjunction with an instruction execution system, apparatus, or device. However, in the present disclosure, the computer-readable signal medium can comprise a data signal propagated in baseband or as part of a carrier wave, in which computer-readable program code is carried. Such a propagated data signal can take any of a variety of forms, comprising but not limited to, an electromagnetic signal, an optical signal, or any suitable combination of the above. The computer-readable signal medium can be any computer-readable medium other than the computer-readable storage medium, and it can send, propagate, or transmit a program for use by or in conjunction with an instruction execution system, apparatus, or device. The program code contained on the computer-readable medium can be transmitted using any suitable medium, comprising but not limited to: a wire, an optical cable, RF (radio frequency), etc., or any suitable combination of the above.

The above computer-readable medium can be contained in the above electronic device; or can be separate and not assembled into the electronic device.

In some embodiments, there is also provided a computer program, comprising: instructions which, when executed by a processor, cause the processor to perform the method of any of the embodiments described above. For example, the instructions can be embodied as computer program code.

In an embodiment of the present disclosure, computer program code for performing operations of the present disclosure can be written in one or more programming languages or any combination thereof, wherein the programming language comprises but is not limited to an object-oriented programming language such as Java, Smalltalk, C++, and also comprises a conventional procedural programming language, such as a "C" programming language or similar programming language. The program code can be executed entirely on a user's computer, partly on the user's computer, as a stand-alone software package, partly on the user's computer and partly on a remote computer or entirely on the remote computer or server. In the scenario where the remote computer is involved, the remote computer can be connected to the user's computer through any type of network, comprising a local area network (LAN) or a wide area network (WAN), or can be connected to an external computer (for example, through the Internet using an Internet service provider).

Flow diagrams and block diagrams in the drawings illustrate the possible architecture, functions, and operations of systems, methods and computer program products according to various embodiments of the present disclosure. In this regard, each block in the flow diagrams or block diagrams can represent one module, program segment, or portion of code, which comprises one or more executable instructions for implementing a specified logic function. It should also be noted that, in some alternative implementations, functions noted in the blocks can occur in a different order from the order noted in the drawings. For example, two blocks shown in succession can actually be executed substantially in parallel, and they can sometimes be executed in the reverse order, which depends upon a function involved. It will also be noted that each block of the block diagrams and/or flow diagrams and a combination of the blocks in the block diagrams and/or flow diagrams can be implemented by a special-purpose hardware-based system that performs the specified function or operation, or a combination of special-purpose hardware and computer instructions.

The module, component or unit described in the embodiments of the present disclosure can be implemented by software or hardware. A name of the module, component, or unit does not in some cases constitute a limitation on the module, component, or unit itself.

The functions described above herein can be performed, at least in part, by one or more hardware logic components. For example, without limitation, an exemplary hardware logic component that can be used comprises: a field programmable gate array (FPGA), application specific integrated circuit (ASIC), application specific standard product (ASSP), system on chip (SOC), complex programmable logic device (CPLD), and the like.

The above description is only some embodiments of the present disclosure and an explanation of technical principles employed. It should be appreciated by those skilled in the art that the disclosure scope involved in the present disclosure is not limited to the technical solution formed by the specific combination of the above features, but also encompasses another technical solution formed by an arbitrary combination of the above technical features or their equivalent features without departing from the above disclosure concepts. For example, it is a technical solution formed by replacing the above features with technical features having functions similar to the disclosed (but not limited to) technical feature in the present disclosure.

In the description provided herein, numerous specific details are set forth. However, it is understood that the embodiments of this invention can be practiced without these specific details. In other cases, well-known methods, structures and techniques have not been shown in detail in order not to obscure an understanding of this description.

Furthermore, while operations are depicted in a specific order, this should not be understood as requiring that such operations be performed in the specific order shown or in sequential order. Under certain circumstances, multitasking and parallel processing can be advantageous. Similarly, while several specific implementation details are comprised in the above discussion, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination. Although some specific embodiments of the present disclosure have been described in detail by way of examples, it should be understood by those skilled in the art that the above examples are for illustration only and are not intended to limit the scope of the present disclosure. It should be appreciated by those skilled in the art that modifications can be made to the above embodiments without departing from the scope and spirit of the present disclosure. The scope of the present disclosure is defined by the attached claims.

What is claimed is:

1. A video processing method, comprising:
    receiving an original caption added by a creator of the video and for a video to be translated;
    selecting a translator based on the original caption and a language used by a user on a social network and according to a type of the video to be translated and a type of videos in which a user is interested, comprising:
        determining expected interest values of a user for different types of videos according to history behavior data of the user,
        determining the type of the videos in which the user is interested according to the expected interest values of the user for the different types of videos, and
    selecting a user for whom the type of the interested videos matches with the type of the video to be translated as the translator;
    providing the selected translator with the video to be translated, and providing, in the video, the translator with an interactive interface for proofreading a previous translation of the original caption in the video;
    receiving a caption translation of the caption returned by the translator from the interactive interface; and
    displaying, in the video, the caption translation passing assessment,
    wherein the providing, in the video, the translator with an interactive interface for proofreading a previous translation of the original caption in the video comprises:
    providing the translator with the previous translation of the original caption in-feed in the video, wherein the original caption and the previous translation of the original caption are displayed on the interactive interface, and an edit control displayed on the interactive interface is directed to a selected previous translation of the original caption; and
    entering a proofreading page, which is in a different window from the interactive interface, in response to an edit request for the selected previous translation from the translator, for the translator to clear the selected previous translation and input the caption translation.

2. The video processing method according to claim 1, wherein the language used by the user comprises at least one of: a system language used by the user, a video language browsed by the user, or a language inputted by the user.

3. The video processing method according to claim 1, wherein the translator comprises a registered community translator.

4. The video processing method according to claim 1, wherein the providing, in the video, the translator with an interactive interface for proofreading a previous translation of the original caption in the video comprises:
    providing the translator with guidance on registration as a community translator.

5. The video processing method according to claim 1, wherein the displaying, in the video, a translation of the caption passing assessment comprises:
    displaying, in the video, a signature of the translator corresponding to the caption translation.

6. The video processing method according to claim 1, further comprising:
    sending a notification to the translator after the caption translation of the translator passes the assessment; and/or
    providing, in the video, with the translator an interactive interface for interaction with a viewer.

7. The video processing method according to claim 1, wherein the original caption added for the video to be translated by the creator of the video is received by providing the creator of the video with an interactive interface for caption management.

8. The video processing method according to claim 7, wherein after the original caption is added by the creator of the video, a caption management page is entered, on which a caption state of the video is displayed, the caption state of the video comprising caption to be generated and caption added.

9. The video processing method according to claim 8, wherein:
    for the video with the caption to be generated, Video View is also displayed on the caption management page; and
    for the video with the caption added, a type of the caption translation is also displayed on the caption management page.

10. A video processing apparatus, comprising:
    a memory; and
    a processor coupled to the memory, the processor being configured to perform, based on instructions stored in the memory, one or more steps of the video processing method according to claim 1.

11. A video processing apparatus, comprising:
    a processor configured to:
    receive an original caption added by a creator of the video and for a video to be translated;
    select a translator based on the original caption and a language used by a user on a social network and according to a type of the video to be translated and a type of videos in which a user is interested, comprising:
        determining expected interest values of an user for different types of videos according to history behavior data of the user, determining the type of the videos in which the user is interested according to the expected interest values of the user for the different types of videos, and selecting a user for whom the type of the interested videos matches with the type of the video to be translated as the translator;

provide the selected translator with the video to be translated, and provide, in the video, the translator with an interactive interface for proofreading a previous translation of the original caption in the video; and receive a caption translation of the caption returned by the translator from the interactive page; and a display configured to display, in the video, the caption translation passing assessment, wherein the processor is configured to:

provide the translator with a previous translation of the original caption in-feed in the video, wherein the original caption and the previous translation of the original caption are displayed on the interactive interface, and an edit control displayed on the interactive interface is directed to a selected previous translation of the original caption; and enter a proofreading page, which is in a different window from the interactive interface, in response to an edit request for the selected previous translation from the translator, for the translator to clear the selected previous translation and input the caption translation.

12. A non-transitory computer-readable storage medium having thereon stored a computer program which, when executed by a processor, implements the video processing method comprising:

receiving an original caption added by a creator of the video and for a video to be translated;

selecting a translator based on the original caption and a language used by a user on a social network and according to a type of the video to be translated and a type of videos in which a user is interested, comprising:

determining expected interest values of an user for different types of videos according to history behavior data of the user, determining the type of the videos in which the user is interested according to the expected interest values of the user for the different types of videos, and selecting a user for whom the type of the interested videos matches with the type of the video to be translated as the translator;

providing the selected translator with the video to be translated, and providing, in the video, the translator with an interactive interface for proofreading a previous translation of the original caption in the video;

receiving a caption translation of the caption returned by the translator from the interactive interface; and displaying, in the video, the caption translation passing assessment, wherein the processor is configured to:

provide the translator with the previous translation of the original caption in-feed in the video, wherein the original caption and the previous translation of the original caption are displayed on the interactive interface, and an edit control displayed on the interactive interface is directed to a selected previous translation of the original caption; and enter a proofreading page, which is in a different window from the interactive interface, in response to an edit request for the selected previous translation from the translator, for the translator to clear the selected previous translation and input the caption translation.

13. The non-transitory computer-readable storage medium according to claim 12, wherein the language used by the user comprises at least one of: a system language used by the user, a video language browsed by the user, or a language inputted by the user.

14. The non-transitory computer-readable storage medium according to claim 12, wherein the processor is configured to select the translator according to a type of the video to be translated and a type of videos in which a user is interested.

15. The non-transitory computer-readable storage medium according to claim 14, wherein the processor is configured to:

determine expected interest values of a user for different types of videos according to history behavior data of the user;

determine the type of the videos in which the user is interested according to the expected interest values of the user for the different types of videos; and select a user for whom the type of the interested videos matches with the type of the video to be translated as the translator.

16. The non-transitory computer-readable storage medium according to claim 14, wherein the display is configured to display, in the video, a signature of the translator corresponding to the caption translation.

* * * * *